April 7, 1959 A. TYKULSKY 2,881,311

METHOD AND MEANS FOR PRODUCING ELECTRICAL WAVES

Filed March 22, 1955 3 Sheets-Sheet 1

INVENTOR
Alexander Tykulsky
BY
Munn, Liddy, Nathanson & March
ATTORNEYS

INVENTOR
Alexander Tykulsky
BY
Munn, Liddy, Nathanson & March
ATTORNEYS

INVENTOR
Alexander Tykulsky
By Munn, Liddy, Nathanson & March
ATTORNEYS

United States Patent Office 2,881,311

Patented Apr. 7, 1959

2,881,311

METHOD AND MEANS FOR PRODUCING ELECTRICAL WAVES

Alexander Tykulsky, Hasbrouck Heights, N.J., assignor to Omega Laboratories, a partnership Application March 22, 1955, Serial No. 496,028

14 Claims. (Cl. 250—27)

This invention relates to methods and means for producing electrical waves, and more particularly to wave-generating methods and means for producing test patterns which are useful in connection with cathode ray equipment.

The invention is shown as applied to the testing of color television receivers; however, it should be understood that the invention is not limited to this particular application, since it has utility generally in connection with the testing of cathode ray equipment.

In color television it is often desirable to check for color convergence and also linearity. With color picture tubes, the face or screen is ordinarily provided with three colors of phosphors, and when white is to be shown the electron beam must be made to register properly on each of the colors. This forms the basis for the test of convergence wherein white dots are produced on the screen by the application to the receiver circuit of a wave having abbreviated timed signal pulses of appreciable magnitude. The means by which the proper pulse wave is produced is known as a dot or wave generator.

An object of the present invention is to provide a novel and improved method for producing waves and wave generator means which supplies not only abbreviated signal pulses to form a uniform test pattern of dots on the screen, but also supplies both horizontal and vertical synchronizing pulses by which the pattern is maintained stable and may be readily used to check for both color convergence and linearity.

Another object of the invention is to provide an improved method and dot or wave generator in accordance with the above, which is extremely simple and foolproof in construction, and reliable in use.

A feature of the invention resides in the provision of a method and wave generator means, as above set forth, wherein a relatively small number of vacuum tubes or equivalent devices are required, in a comparatively simple circuit.

In carrying out the above object, I provide, in the embodiment of the invention illustrated herein, a plurality of astable oscillating generators or multivibrators which are made cooperable with each other by novel synchronization techniques. The frequencies and circuits of the multivibrators are so organized and arranged as to provide with a minimum of equipment the desired synchronizing and dot pulses in the resultant test wave.

Other features and advantages will hereinafter appear.

In the accompanying drawings:

In Fig. 4 the dots are shown as being black on a white background, whereas in actual practice they are white on a black background.

Figure 1:
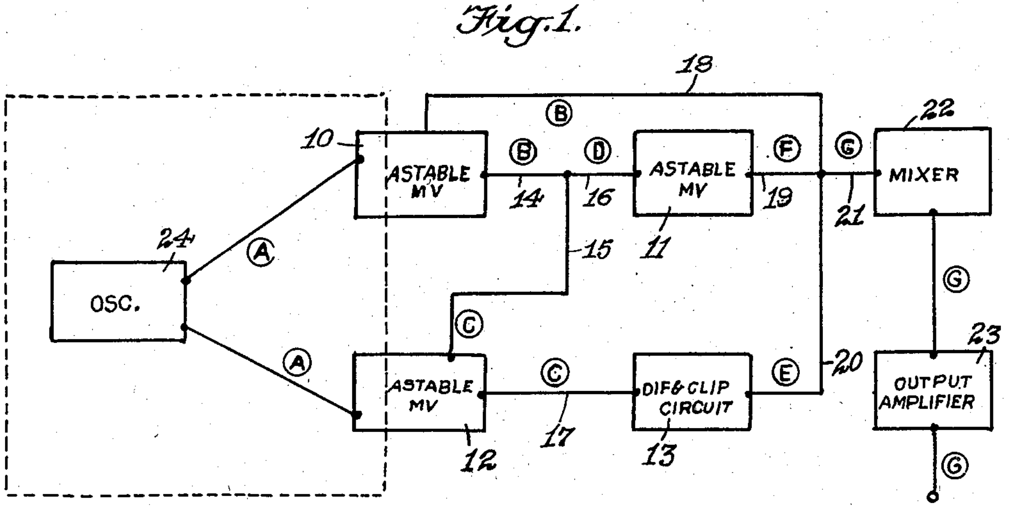
Figure 1 is a block diagram of a wave generator made in accordance with the invention.

The improved electric wave producing apparatus of the present invention as shown in Fig. 1 comprises a plurality of astable oscillatory generators organized and arranged in a novel manner and having their free-running frequencies so related as to provide a novel wave output capable of producing a dot pattern which is advantageous in the testing of cathode ray equipment, especially color television receivers.

The apparatus of Fig. 1 comprises essentially first, second and third oscillatory generators 10, 11 and 12, respectively, which in the embodiment of the invention disclosed herein constitute astable multivibrators. I arrange the generators or multivibrators 10 and 11 to have free-running frequencies comparable with the horizontal and vertical synchronizing frequencies at present used in television practice. Specifically, the frequency of the first multivibrator 10 may be on the order of 15.6 kc., as compared with 15.75 kc. currently employed in television receivers, and the free-running frequency of the second multivibrator 11 may be made slightly less than 60 c.p.s.

By the present invention the frequencies of the first and third multivibrators 10 and 12 are chosen so that their ratio is very close to unity, and so that their difference is a harmonic of the vertical synchronizing frequency used in television practice, namely 60 c.p.s. or substantially the frequency of the second multivibrator 11. I have found that by making the frequency of the multivibrator 10 equal to 15.6 kc. and the frequency of the third multivibrator 12 equal to 14.4 kc. an advantageous relationship is obtained in that the ratio of these frequencies is as 13 is to 12 and the difference of the frequencies, namely 1.2 kc., is the twentieth harmonic of 60 c.p.s., the vertical synchronizing frequency which is essentially that of the second multivibrator.

I have discovered that if the outputs of the first and third multivibrators 10 and 12 are combined, the wave will contain a pulse having a periodicity of 1.2 kc. which will be capable of triggering the second multivibrator 11 to operate it at 60 c.p.s. I am then provided with waves of 15.6 kc. and 60 c.p.s. from the first and second multivibrators, and combine these to produce a resultant wave having pulses showing both said frequencies.

Moreover, I have found that the 14.4 kc. wave from the multivibrator 12 may be advantageously differentiated and clipped by bringing it to a suitable element 13, to produce abbreviated pulses which may be further combined with the composite waves from the first and second multivibrators 10 and 11, thereby to produce dots in a test pattern occuring one for each horizontal line of the pattern and out of vertical alignment with each other (each dot occuring to the right of its predecessor).

As shown in Fig. 1 the outputs of the first and third multivibrators 10 and 12 are brought through circuits 14 and 15 respectively and combined in a circuit 16 which constitutes the input of the second multivibrator 11. The output of the third multivibrator 12 is also carried by a circuit 17 to the differentiation and clip apparatus 13, by which abbreviated pulses of appreciable magnitude are produced, having a frequency of 14.4 kc., the same as that of the third multivibrator.

The first and second multivibrators 10 and 11 and the differentiation and clip apparatus 13 have output circuits 18, 19 and 20, respectively, which are collected in a circuit 21 and impressed on a mixer 22 by which the respective waves are suitably combined. The output from the mixer 22 may be brought to a suitable amplifier 23 for amplification.

Further in accordance with the invention, I have chosen the frequencies of the first and third multivibrators so that they are different sub-multiples of a higher frequency which may be produced by a driving or trigger device, indicated at 24 in Fig. 1. The device 24 may be an L–C oscillator of the well-known Colpitts or Hartley type, and I operate the oscillator 24 at 187.2 kc. which is the twelfth harmonic of the frequency of the first multivibrator 10 and the thirteenth harmonic of the frequency of the third multivibrator 12.

Figure 4:
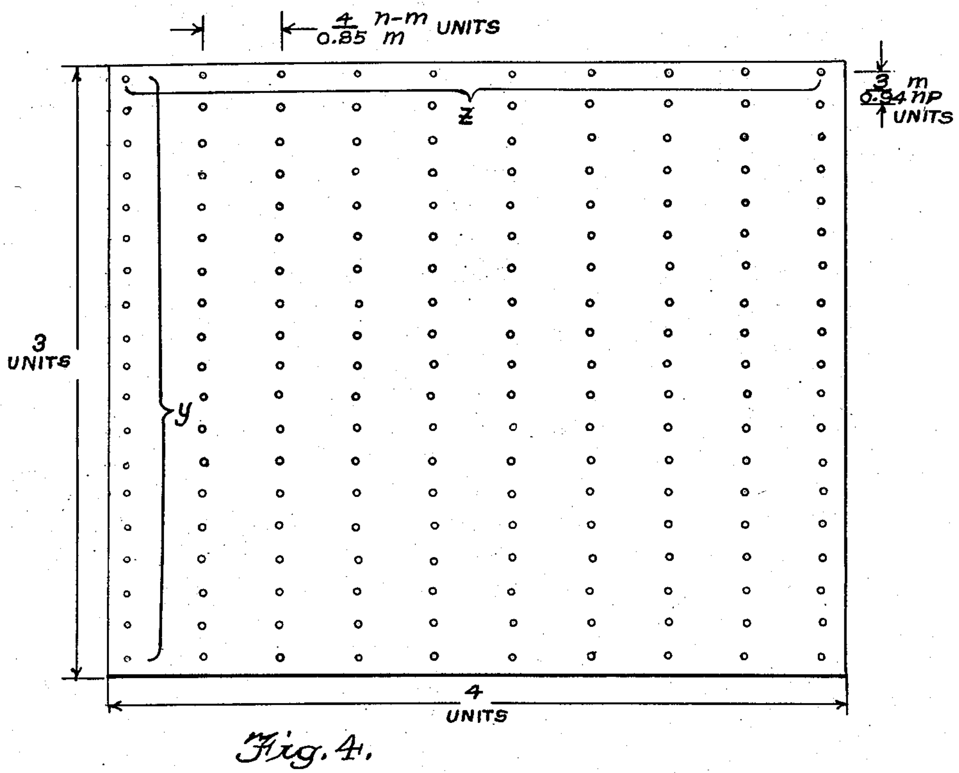
Fig. 4 is a diagram showing the test pattern of dots resulting from the application of the wave of Fig. 3 to a television receiver circuit.

I have found that by means of such a trigger or oscillator 24 all three multivibrators 10, 11 and 12 may be triggered to produce horizontal synchronizing pulses, vertical synchronizing pulses and abbreviated signal pulses manifesting as dots on a cathode ray screen, and that with the apparatus of Fig. 1 these three sets of pulses may be combined into a single wave which therefore contains complete information suitable for use with a television receiver, to provide a desirable and advantageous test pattern as shown in Fig. 4. It will be noted that this test pattern is locked in the position shown by reason of both the horizontal and vertical synchronizing pulses.

Figure 5:
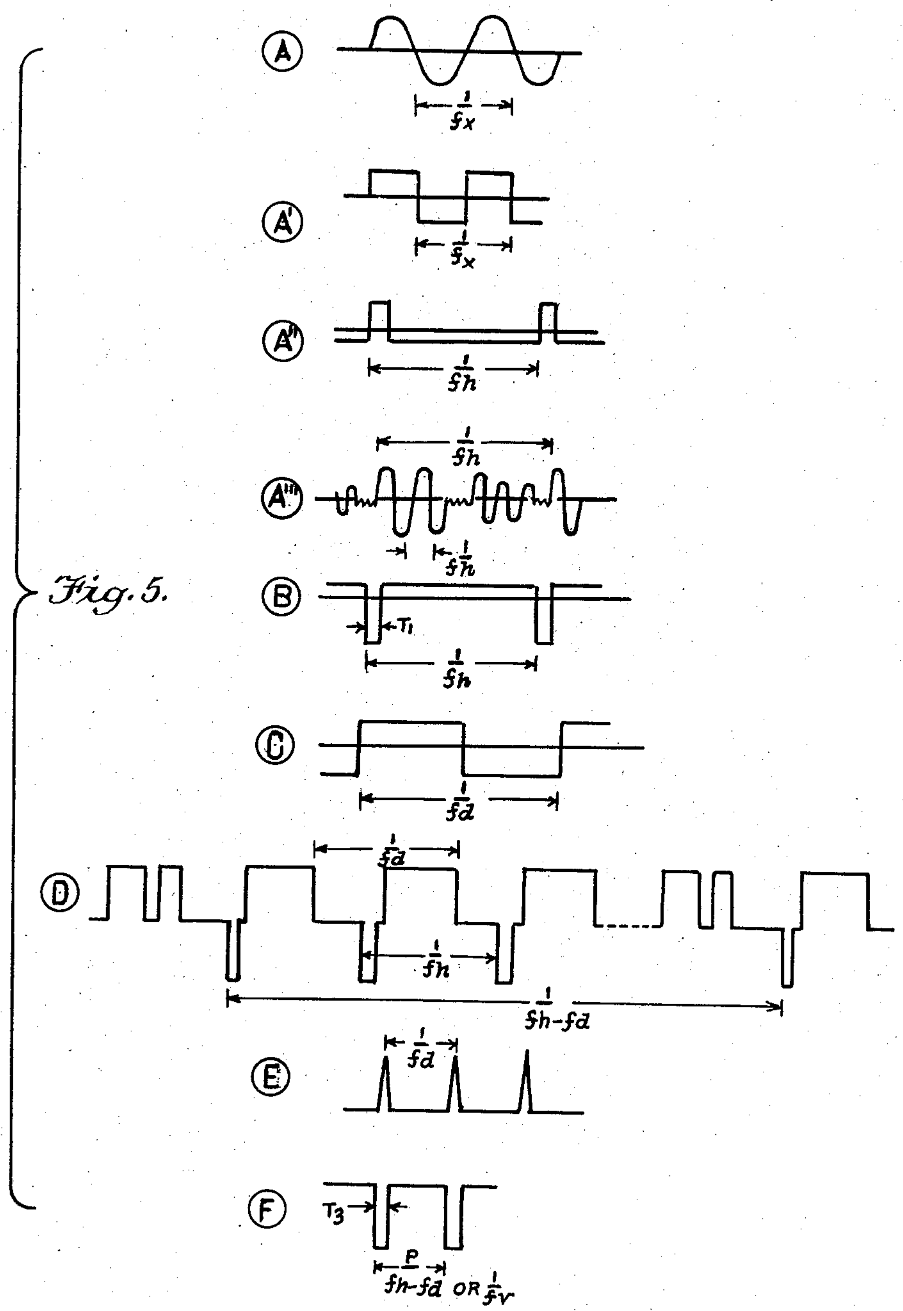
Fig. 5 is a diagram showing the various wave shapes in the apparatus of Figs. 1 and 2.

The wave shapes of the apparatus of Fig. 1 are given in graphic form in Fig. 5. Wave A in Fig. 5 is shown as a sinusoidal wave of frequency 187.2 kc., and this wave exists in the output circuits A, A leading from the oscillator 24 to the first and third multivibrators 10 and 12. From the first multivibrator 10 wave B (Fig. 5) is obtained, having a frequency of 15.6 kc., said wave existing in the output circuits B, B of the first multivibrator. From the third multivibrator 12 wave C is obtained, having a frequency of 14.4 kc., said wave existing in the output circuits C, C of the multivibrator 12.

In the circuit 16 of Fig. 1 wave D (Fig. 5) obtains, being a composite of the waves B and C and containing pulses having a periodicity of 14.4 kc. and also pulses having a periodicity of 15.6 kc., the latter being close to the regular horizontal synchronizing frequency of television practice. Also present in the wave D are pulses representing the difference of the above two frequencies, namely 1.2 kc. as indicated, and these pulses have the ability to trigger the second multivibrator 11 and operate the latter at 60 c.p.s.

It is noted that the multivibrator 11 retains its ability to select as a trigger the pulse group occurring at intervals in the neighborhood of its natural frequency, and accordingly the 1.2 kc. pulses will be effective to trigger this multivibrator. In Fig. 5 wave E shows the abbreviated and clipped pulses in the output of the device 13, having the same frequency as the output of the third multivibrator 12, namely 14.4 kc.

From the second multivibrator a 60 cycle wave is obtained in the output circuit 19, as shown at F in Fig. 5. The waves B, E and F are combined in the circuit 21 and mixer 22 to produce the final test wave shown in Fig. 3. This final wave contains abbreviated signal pulses 26 from the wave E, horizontal synchronizing pulses 27 from the wave B and vertical synchronizing pulses 28 from the wave F.

Figure 3:
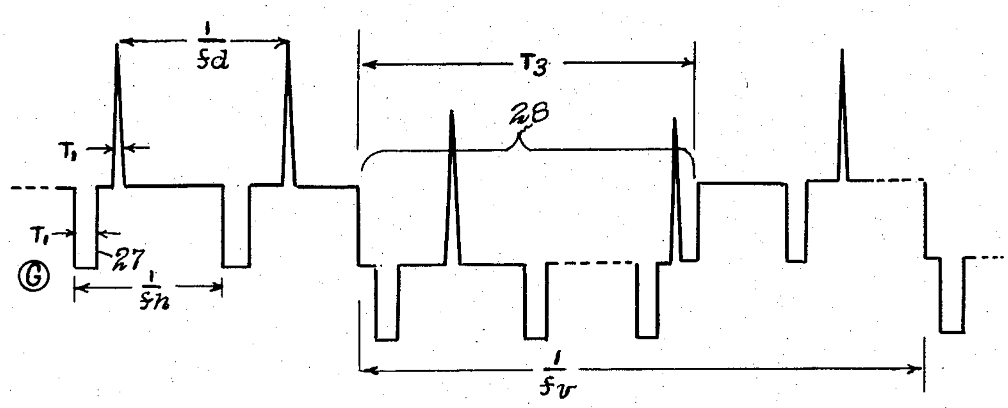
Fig. 3 is a diagram showing the output wave of the generator of Fig. 1.

I obtain this advantageous test wave as shown in Fig. 3 by my novel method explained above and by the provision of the relatively simple, composite generator apparatus shown in Fig. 1, and have found that the test wave of Fig. 3 is extremely advantageous and desirable in providing a test pattern on the screen of cathode ray tubes such as are employed in color television, to test for convergence and linearity. The pulses 26 provide white dots on a black background on the screen, there being one dot for each horizontal line of the pattern and each dot occurring a distance to the right of its immediate predecessor. My apparatus is reliable in its operation, economical to fabricate, and relatively small and compact, and provides a desirable adjunct in the servicing of color television receivers and kindred cathode ray apparatus.

In place of the oscillator 24 there may be used an astable multivibrator operating at the same frequency as the oscillator, namely 187.2 kc.

Figure 2:
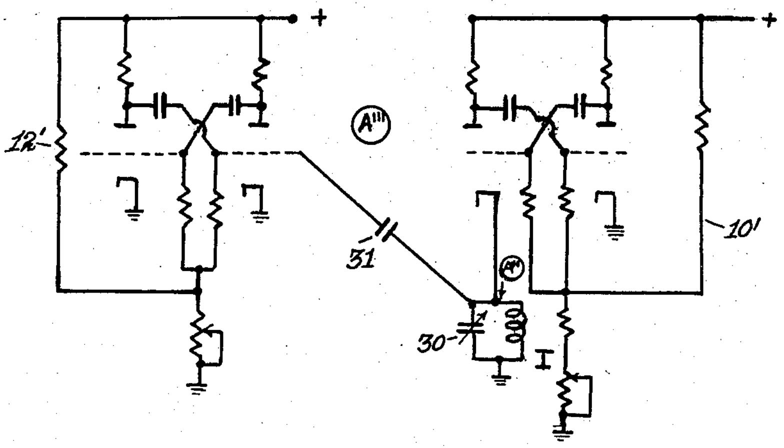
Fig. 2 is a schematic diagram showing an alternative circuit for a portion of the wave generator of Fig. 1.

I have found that as an alternative I may couple the first and third multivibrators to a tuned instrumentality to cause these to operate at the desired frequencies, namely 15.6 kc. and 14.4 kc. In Fig. 2 a schematic diagram is shown illustrating a first multivibrator 10' and a third multivibrator 12'. In the cathode circuit of the multivibrator 10' I provide an L–C tank circuit 30 which is tuned to 187.2 kc., and couple this tank circuit through a suitable capacitor 31 or other means to the third multivibrator 12'. The first multivibrator 10' is adjusted to lock on a frequency of 14.4 kc. The voltage generated in the tuned circuit 30 contains energy at harmonics of 15.6 kc. (the frequency of the first multivibrator 10') and principally at a frequency of 187.2 kc. which is the twelfth harmonic. This voltage acts as a trigger source for the third vibrator 12', locking it at 14.4 kc. which is 1/13 of the frequency 187.2 kc. In other words, the wave form of the voltage across the tank circuit 30 includes a periodicity of 187.2 kc. which permits synchronization of the third multivibrator 12' at a frequency of 14.4 kc. Thus, by the use of a passive tuned or tank circuit such as the circuit 30 of Fig. 2 I can couple the first and third multivibrators to control their periodicity and obtain the outputs from them which I desire.

In Fig. 5 wave A' having a frequency of 187.2 would be that obtained when a multivibrator is used in place of the oscillator 24, the said wave A' being impressed on the first and third multivibrators 10, 12. In Fig. 5 wave A'' would be that found in the cathode circuit of the multivibrator 10' shown in Fig. 2, and the wave A''' would be that found in the coupling circuit between the first and third multivibrators 10' and 12'. It will be noted that the wave A'' is of 15.6 kc. frequency and that the wave A''' contains pulses having a periodicity of 15.6 kc. and also pulses having a periodicity of 187.2 kc., which latter is the twelfth harmonic of 15.6 kc.

The relations set forth above may be illustrated by the use of formulae as follows: Considering the ratio of the frequency 15.6 to 14.4 as 13 to 12, 12 may be represented by the letter $m$ and 13 by the letter $n$. $p$ may represent 20, which is the order of the harmonic of the frequency of the second multivibrator 11, said harmonic being constituted of the difference of the frequencies of the first and third multivibrators. 187.2 kc. may be represented by $f_x$, 15.6 kc. may be represented by $f_h$, 14.4 kc. may be repersented by $f_d$ and 60 c.p.s. may be represented by $f_v$. It is noted that $m$, $n$ and $p$ are integers. Then $$mf_h = nf_d = mnpf_v$$

It will be noted that the wave D of Fig. 5 contains pulse groups which have a periodicity of $f_h - f_d$ (=1.2 kc.) or $$f_x\left(\frac{1}{m} - \frac{1}{n}\right)$$

which is the same as $$f_x\left(\frac{n-m}{mn}\right)$$

By making the free-running frequency of the second multivibrator 11 slightly less than 60 c.p.s. (=$f_v$) it will lock at 60 c.p.s. which is a sub-harmonic of $f_h - f_d$ (=1.2 kc.) or $$f_x\left(\frac{n-m}{mnp}\right)$$

As shown in Fig. 4 the dimensions of the test pattern are given in terms of the integers $m$, $n$ and $p$, $z$ representing the number of dots horizontally and $y$ representing the number of dots vertically. $z$ equals the closest integer below $$\frac{0.85m}{n-m}$$

$y$ equals the closest integer below $$\frac{0.94np}{m}$$

After $$\frac{m}{n-m}$$

lines (12 lines) the pattern repeats itself on the screen.

In Fig. 3, the wide negative pulse 28 provides the vertical or frame synchronization at intervals of $$\frac{np}{n-m}\frac{1}{f_h}$$

(which equals 1/60 sec.).

In Fig. 3 the pulse widths $T_1$ and $T_3$ are chosen to conform to television standards. The pulse width $T_2$ is made as small as possible. The frequency $f_x$ and the integers $m$, $n$ and $p$ have been so calculated that $f_h$ and $f_v$ are at or close to the standard synchronizing frequencies used in television, and so that the dots of the test pattern are suitably dispersed on the screen. It will be noted from Fig. 3 that the horizontal synchronizing pulses run through the vertical synchronizing period.

The wave shown in Fig. 3 may be applied either directly to the video amplifier of the television receiver, or it may be used to modulate an oscillator which is fed to the antenna terminals of the receiver.

The multivibrators 10 and 11 are designed for on-off periods conforming to television standards, as indicated by the pulse widths $T_1$ and $T_3$ shown in Fig. 3.

From Fig. 1 it will be seen that aside from the mixer 22 and the output amplifier 23 which would be present in any apparatus of this type, the device of the present invention requires only four vacuum tubes where the oscillator 24 or substitute multivibrator therefor is employed, and requires only three vacuum tubes with the alternative circuit shown in Fig. 2.

While in the embodiment of the invention illustrated and described herein specific frequencies were given, it should be understood that the invention is not limited to said frequencies but instead is more properly defined in the appended claims.

Variations and modifications may be made within the scope of the claims and portions of the improvements may be used without others.

I claim:

1. Means for producing an electrical wave for use with cathode ray apparatus to provide a test pattern therefor, comprising first, second and third astable, oscillatory generators having different free-running frequencies, the frequencies of the first two of said generators being widely separated and the frequency of the third generator differing from that of the first generator by a value which is substantially a harmonic of the frequency of the second generator; means for operating said first and third generators at their intended frequencies; means applying the outputs of the first and third generators to the second generator to trigger the latter at or near its free-running frequency; means providing from one of said outputs abbreviated pulses of appreciable magnitude; and means combining said pulses with the outputs of the first and second generators to produce a wave having two sets of synchronizing pulses of widely different frequencies and also abbreviated signal pulses capable of being reproduced as dots on a cathode ray screen.

2. Means for producing an electrical wave for use with cathode ray apparatus to provide a test pattern therefor, comprising first, second and third astable, oscillatory generators having different free-running frequencies, the frequencies of the first two of said generators being at or near the vertical and horizontal synchronizing frequencies in television practice, and the frequency of the third generator differing from that of the first generator by a value which is substantially a harmonic of the frequency of the second generator; means for triggering said first and third generators; means applying the outputs of the first and third generators to the second generator to trigger the latter at or near its free-running frequency; means providing from one of said outputs abbreviated pulses of appreciable magnitude; and means combining said pulses with the outputs of the first and second generators to produce a wave having both horizontal and vertical synchronizing pulses and also abbreviated signal pulses capable of being reproduced as dots on a cathode ray screen.

3. The invention as defined in claim 2 in which the triggering means comprises an oscillator tuned to a frequency which is a multiple of each of the frequencies of said first and third generators.

4. The invention as defined in claim 2 in which the triggering means include an astable multivibrator having a frequency which is a multiple of each of the frequencies of said first and third generators.

5. Means for producing an electrical wave for use with cathode ray apparatus to provide a test pattern therefor, comprising first, second and third astable, oscillatory generators having different free-running frequencies, the frequencies of the first two of said generators being at or near the vertical and horizontal synchronizing frequencies in television practice, and the frequency of the third generator differing from that of the first generator by a value which is substantially a harmonic of the frequency of the second generator; means for operating said first and third generators at their intended frequencies; means applying the outputs of the first and third generators to the second generator to trigger the latter at or near its free-running frequency; means providing from one of said outputs abbreviated pulses of appreciable magnitude; and means combining said pulses with the outputs of the first and second generators to produce a wave having both horizontal and vertical synchronizing pulses and also abbreviated signal pulses capable of being reproduced as dots on a cathode ray screen.

6. The invention as defined in claim 5 in which the frequencies of the first and third generators are respectively substantially 15.6 kilocycles and 14.4 kilocycles per second.

7. The invention as defined in claim 6 in which the frequency of the second generator is slightly less than 60 cycles per second.

8. The invention as defined in claim 5 in which the difference in the frquencies of the first and third generators is the 20th harmonic of the frequency of the second generator.

9. The invention as defined in claim 5 is which the means for operating the first and third generators includes a tank circuit tuned to a frequency which is a multiple of each of the frequencies of said first and third generators.

10. The invention as defined in claim 5 in which the frequencies of the first and third generators are to each other as 13 is to 12.

11. The combination of two astable, oscillatory generators having different free-running frequencies which are substantially subharmonics of a higher frequency and which constitute close fractional values of said higher frequency; means connected between said generators, for locking the same at their respective frequencies when they are operating; another astable oscillatory generator having a free-running frequency which is substantially a subharmonic of the difference of the frequencies of said two generators, said other generator being triggered by the combined output of the two generators; and means combining outputs from the three said generators, including means clipping the output of one of said two generators prior to said output being so combined.

12. The combination of two astable, oscillatory generators having different free-running frequencies which are substantially subharmonics of a higher frequency; means connected between said generators, for locking the same at their respective frequencies when they are operating; another astable oscillatory generator having a free-running frequency which is substantially a subharmonic of the difference of the frequencies of said two generators, said other generator being triggered by the combined output of the two generators; means providing from the output of one of the two generators abbreviated signal pulses of appreciable magnitude; and means combining said pulses with the outputs of the said other generator and one of said two generators, to produce a wave having two sets of synchronizing pulses of different frequencies and also abbreviated signal pulses.

13. The invention as defined in claim 12, in which the other of the said two generators has a frequency at or close to the horizontal synchronizing frequency of a television receiver.

14. The invention as defined in claim 12, in which the means connected between the generators comprises a tunable device tuned to said higher frequency.

References Cited in the file of this patent

UNITED STATES PATENTS

| | | |
|---|---|---|
| 2,166,688 | Kell | July 18, 1939 |
| 2,553,165 | Bliss | May 15, 1951 |
| 2,560,576 | Hoeppner | July 17, 1951 |
| 2,591,816 | Holland et al. | Apr. 8, 1952 |
| 2,693,530 | Macdonald | Nov. 2, 1954 |

FOREIGN PATENTS

| | | |
|---|---|---|
| 293,272 | Switzerland | Dec. 1, 1953 |